United States Patent
Stine et al.

(10) Patent No.: US 7,873,391 B2
(45) Date of Patent: *Jan. 18, 2011

(54) CALL QUEUE IN A WIRELESS DEVICE

(75) Inventors: Ted Stine, Belle Mead, NJ (US); Joseph A. Speeney, Basking Ridge, NJ (US)

(73) Assignee: AT&T Mobility II LLC, Atlanta, GA (US)

( * ) Notice: Subject to any disclaimer, the term of this patent is extended or adjusted under 35 U.S.C. 154(b) by 312 days.

This patent is subject to a terminal disclaimer.

(21) Appl. No.: 12/120,048

(22) Filed: May 13, 2008

(65) Prior Publication Data

US 2008/0214181 A1 Sep. 4, 2008

Related U.S. Application Data

(63) Continuation of application No. 10/017,629, filed on Dec. 13, 2001, now Pat. No. 7,373,179.

(51) Int. Cl.
*H04B 1/38* (2006.01)
*H04M 1/00* (2006.01)

(52) U.S. Cl. .................. 455/564; 455/445; 455/551

(58) Field of Classification Search .................. None
See application file for complete search history.

(56) References Cited

U.S. PATENT DOCUMENTS

| 5,600,704 A | 2/1997 | Ahlberg et al. |
| 5,644,624 A | 7/1997 | Caldwell |
| 5,844,980 A | 12/1998 | Patel et al. |
| 5,890,064 A | 3/1999 | Widergen et al. |
| 6,034,687 A | 3/2000 | Taylor et al. |
| 6,223,046 B1 | 4/2001 | Hamill-Keays et al. |
| 6,363,411 B1 | 3/2002 | Dugan et al. |
| 6,473,615 B1 | 10/2002 | Theppasandra et al. |
| 6,721,577 B2 | 4/2004 | Humes |
| 2004/0224682 A1 | 11/2004 | Kang |

OTHER PUBLICATIONS

"User's Guide: Nokia 8310," Nokia Mobile Phones Ltd., Sep. 2001.

*Primary Examiner*—Sujatha Sharma
(74) *Attorney, Agent, or Firm*—Moazzam & Associates, LLC

(57) ABSTRACT

A wireless phone includes a memory, a processor, and a call queue function, the call queue function to enable the configuration and storage in the memory of a call queue, the call queue comprising an ordered list of entries to dial, wherein the processor and the memory cooperate to enable the call queue function.

42 Claims, 4 Drawing Sheets

CALL QUEUE IN A WIRELESS DEVICE

TECHNICAL FIELD

This invention relates to call queues. More specifically, the invention relates to user configuration of a call queue and management of the queue for communication devices.

BACKGROUND

Wireless communication has become highly popular. Every day, people all over the world communicate using wireless telephones and pagers, to name just some of the wireless applications. Wireless networks are increasingly employed to communicate non-voice information, such as stock quotes, email, and text. Wireless networks may be global and span the equipment and services of multiple service providers.

Wireless telephones have been criticized as a distraction to their users, especially while the users are driving or otherwise in transit. There have been reports of accidents resulting from distracted drivers who take their eyes off the road in order to dial their wireless phones. For this and for reasons of general convenience, efforts have been made to make dialing from wireless phones more convenient and less distracting.

One approach which addresses these concerns is to assign frequently called numbers to "speed dial" functions. Operating the speed dial function for a number causes the phone to dial the number. A limitation of this approach is that the number of speed dial functions is limited, and the user may still be distracted by the process of locating and operating the correct speed dial function for the number they wish to call.

Another approach involves electronic address books stored by the phone. Address books allow the phone user to associate names with numbers. The user locates in the address book the name of the party they wish to contact, and then causes the phone to dial the corresponding number. Again, a disadvantage is the distraction inherent in locating a name in the address book.

SUMMARY

In one aspect, a wireless phone includes a memory, a processor, and a call queue function, the call queue function to enable the configuration and storage in the memory of a call queue, the call queue comprising an ordered list of entries to dial, wherein the processor and the memory cooperate to enable the call queue function.

In another aspect, a communication system of a communication service provider includes a first computer system having a call queue for a wireless device. The call queue is indexed by an identification of the wireless device. A queue management function provides a next number to dial from the call queue in response to receipt of a queue dial request from the wireless device.

DRAWINGS

DESCRIPTION

In the following figures and description, like numbers refer to like elements. References to "one embodiment" or "an embodiment" do not necessarily refer to the same embodiment, although they may. Although various embodiments described herein are described and illustrated in conjunction with wireless devices, the present invention is also applicable to communication devices which operate in a wired fashion. While some embodiments are discussed in terms of phones, the principles of the present invention are applicable to a range of devices, including hand-held and portable computers, and paging devices.

According to one embodiment, a user of a communication device, such as a wireless telephone, configures a call queue. Each time a number is dialed from the call queue, the number is then removed from the call queue. According to another embodiment, dialed numbers remain in the call queue, and the call queue is managed in a "round-robin" fashion. According to one embodiment, a next number to dial is both selected and dialed from the call queue by operating a single function (for example, by operating a single button or a multiple-button combination on the phone). According to another embodiment, operating a first function selects a next number of the call queue, and operating a second function dials the number. The next number may be chosen sequentially, or according to a user-defined order, or in various other manners.

Often, the user will configure the call queue prior to travel or other situations where distractions due to dialing should be reduced. The call queue may be stored by a communication service provider, or by the wireless device. The call queue comprises numbers which may be conveniently selected and dialed by operating one or a few device functions. For example, in one embodiment a single button of a wireless phone, or a single spoken command, may initiate dialing to first number of the call queue. Upon completion of the call to the first number, the first number is removed from the call queue, and operating the dial function a second time dials a next number of the call queue. Alternately, the next number may be dialed automatically after completion of the first call.

Figure 1:
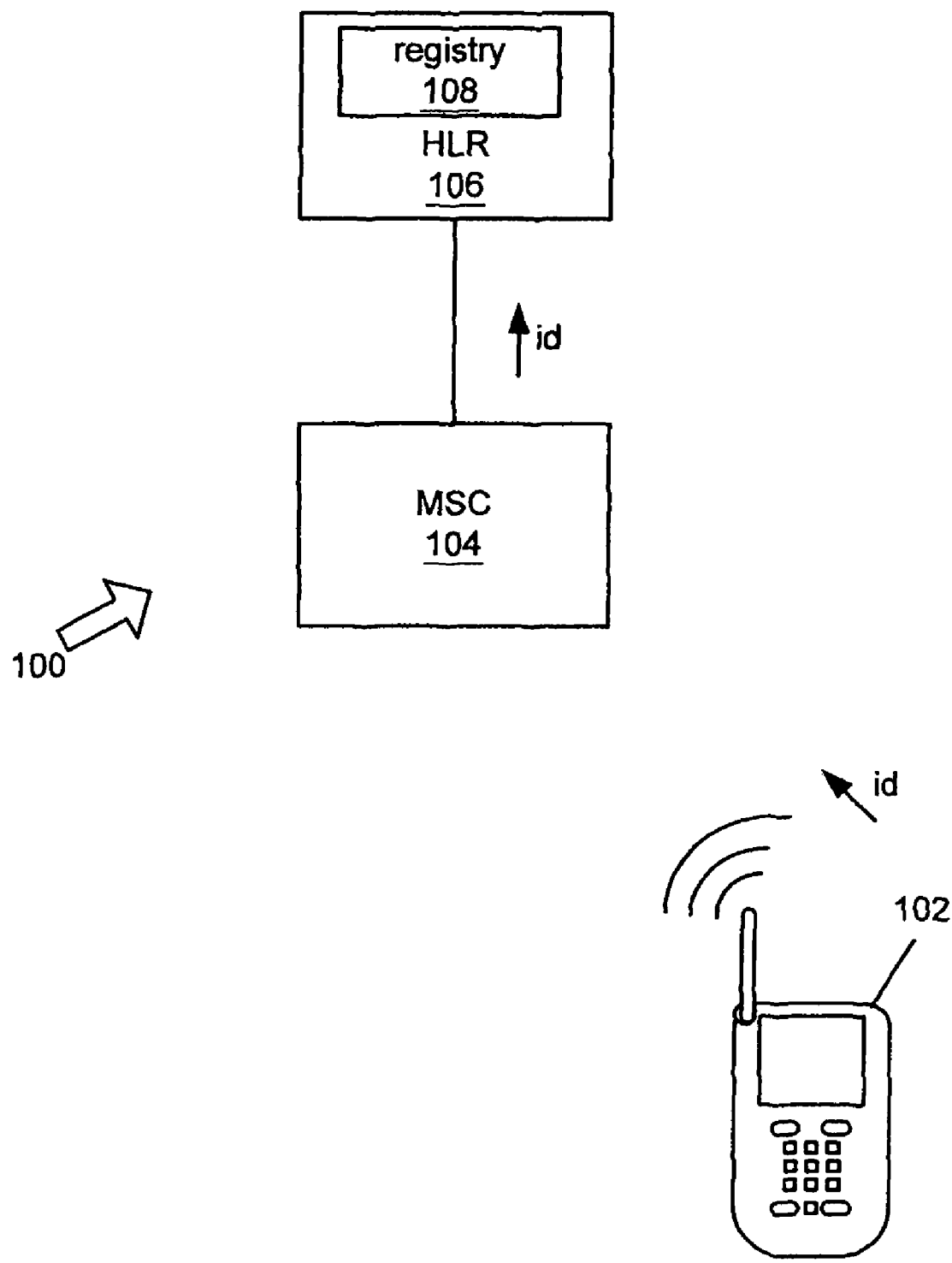
FIG. 1 is a block diagram of an embodiment of a communication system.

FIG. 1 is a block diagram of an embodiment 100 of a wireless communication system. To access the system, a wireless device such as a phone 102 may communicate with a mobile switching center (MSC) 104. The MSC 104 may operate as a wireless "front end" to the communication service provider, by converting wireless signals to a form suitable for transmission in electrical or optical form. The MSC 104 may communicate with a home location registry (HLR) 106 which may comprise a user registry 108. The HLR 106 may employ an identification (id) provided by the phone 102 to locate a record in the registry 108 for the user of the phone 102. The user record may comprise permissions in accordance with the user's selected service plan, as well as other information about the user. The HLR 106 may communicate the service plan permissions to the MSC 104, and the MSC 104 may then provide the user's phone 102 or other wireless device with access to the network in accordance with the permissions. For example, if the user's service plan comprises data services, the permissions to the MSC 104 may enable the wireless device to send and receive email via the network. If data service is lacking from the service plan, the permissions may enable only voice access.

The HLR 106 may comprise a single computer system, or a 'site' or computer center, e.g. a system of more than one computer and associated peripheral equipment. A computer system is any device comprising a processor and a memory, wherein the memory stores instructions and data (together, logic). The memory may provide the instructions to the processor for execution, to manipulate the data. The MSC 104 may comprise a combination of computer systems, switching systems, and wireless signaling systems.

Figure 2:
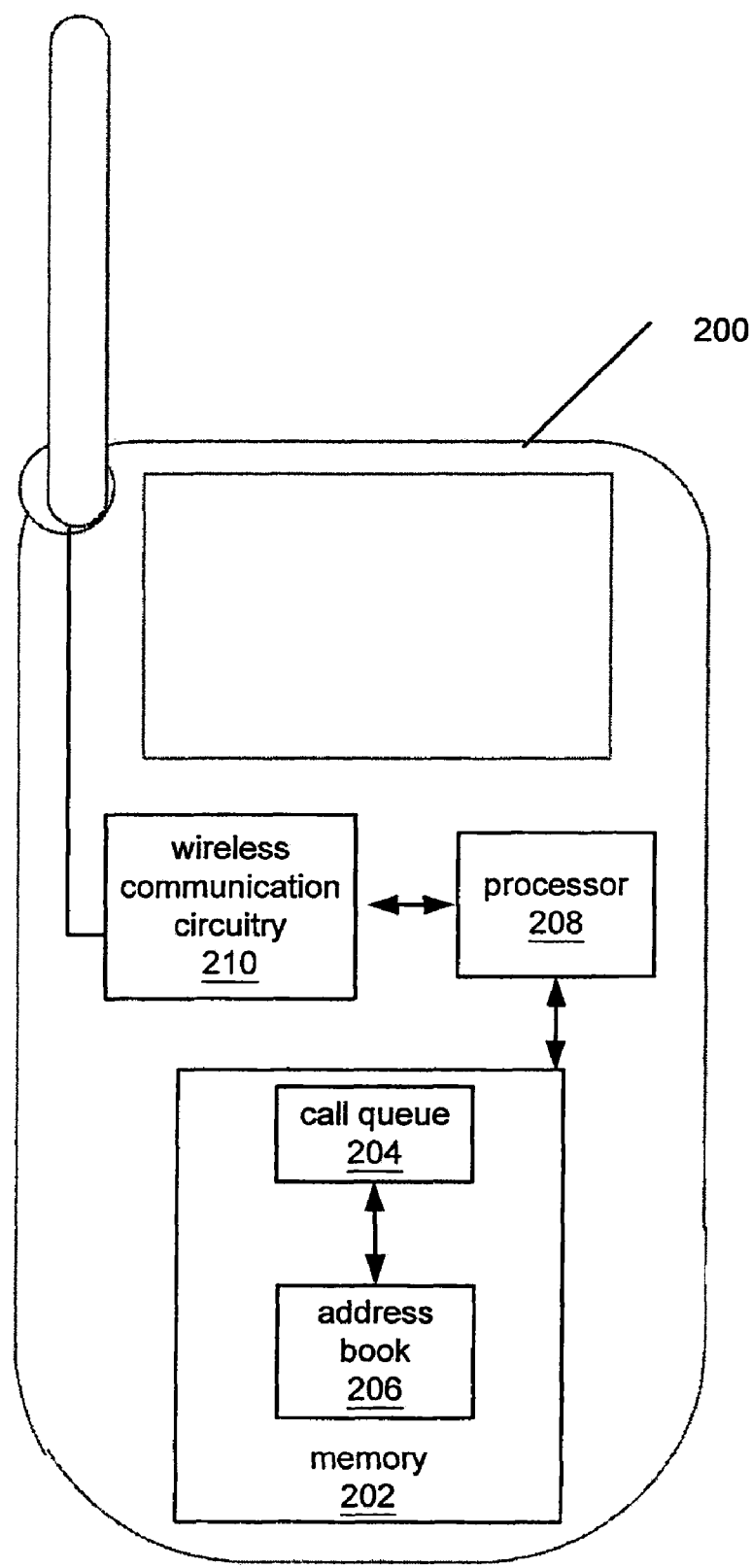
FIG. 2 is a block diagram of an embodiment of a wireless communication device.

According to one embodiment, the phone 102 or other wireless device may store a user-configured call queue. In another embodiment, the user registry 108 may be utilized to store the call queue. FIG. 2 is a block diagram which shows an embodiment 200 of a wireless phone comprising a call queue. The phone 200 comprises a memory 202 and a processor 208. Instructions and data stored by the memory 202 may be supplied to the processor 208, which may execute the instructions and operate upon the data in order to carry out dialing and other communication functions. The memory 202 may comprise one or a combination of various storage technologies such as flash memory, ROM, CMOS, RAM, and so on. The processor 208 is coupled to the wireless communication circuitry 210 to exchange signals wirelessly with the MSC 104.

In one embodiment, the memory 202 may comprise a call queue 204 and an address book 206. The address book 206 comprises names associated with the numbers of dial-able parties. The address book 206 is organized as a collection, in the sense that it is unordered. The call queue 204 comprises one or more numbers organized and managed as a queue, e.g. as an ordered list. Operation of a queue dialing function of the phone causes a first number of the queue to be dialed to initiate a first call. Examples of a dial function are pressing a button and speaking a command to the phone. Operation of the queue dialing function a second time results in dialing of a second number. Subsequent to dialing a number, and as a result of operation of the queue dialing function, the dialed number may be removed from the queue. In other words, the queue may be consumed as a consequence of dialing. Once all numbers of the queue are dialed, the queue is empty and ready to be reconfigured with more numbers.

The call queue 204 may initially be empty when the phone 102 is sold or otherwise distributed. The phone 102 as distributed may comprise call queue functionality to enable a user to specify entries of the call queue 204, and possibly also to specify a dial order for the entries. The call queue function may comprise instructions and data stored in the memory 202 of the phone 102. The instructions and data may be provided to the processor 208 which, in cooperation with the memory 202 and various buttons, spoken commands, prompts (visual or otherwise), and other controls of the phone 102 may operate to configure and store the call queue 204 in the memory 202.

Likewise, the address book 206 may initially be empty when the phone 102 is sold or otherwise distributed. The phone 102 as distributed may comprise address book functionality to enable a user to specify entries of the address book 206. The address book function may comprise instructions and data stored in the memory 202 of the phone 102. The instructions and data may be provided to the processor 208 which, in cooperation with the memory 202 and various buttons, spoken commands, prompts (visual or otherwise), and other controls of the phone 102, may operate to configure and store the address book 206 in the memory 202.

Use of the call queue 204 may reduce dialing distractions experienced by users of communication devices, particularly wireless communication devices. For example, prior to driving a car, a user of the phone 200 may enter several numbers into the call queue 204 using a keypad of the phone 200, or by speaking the numbers when the voice comprises voice recognition. The queue 204 and the address book 206 may be coupled, so that the user may specify call queue entries by name instead of number. Prior to dialing, the address book 206 is accessed to retrieve the number corresponding to the name. By operating the queue dialing function, the user may, while driving, initiate calls to all of the numbers in the queue without incurring the distraction of entering the digits to dial, or locating a particular speed dial button, or locating a name in the address book. In one embodiment, operating the queue dialing function a single time initiates dialing to the first number in the queue. Upon terminating (disconnecting) the first call, dialing to the second number in the queue 204 may be automatically initiated, and so on. In other embodiments, the queue dial function is operated each time a next queue entry is to be dialed.

In one embodiment, the user may specify an ordering for dialing the entries of the queue 204 which is non-sequential. In another embodiment, the entries of the queue are dialed in the order, or reverse order, in which they were entered.

Figure 3:
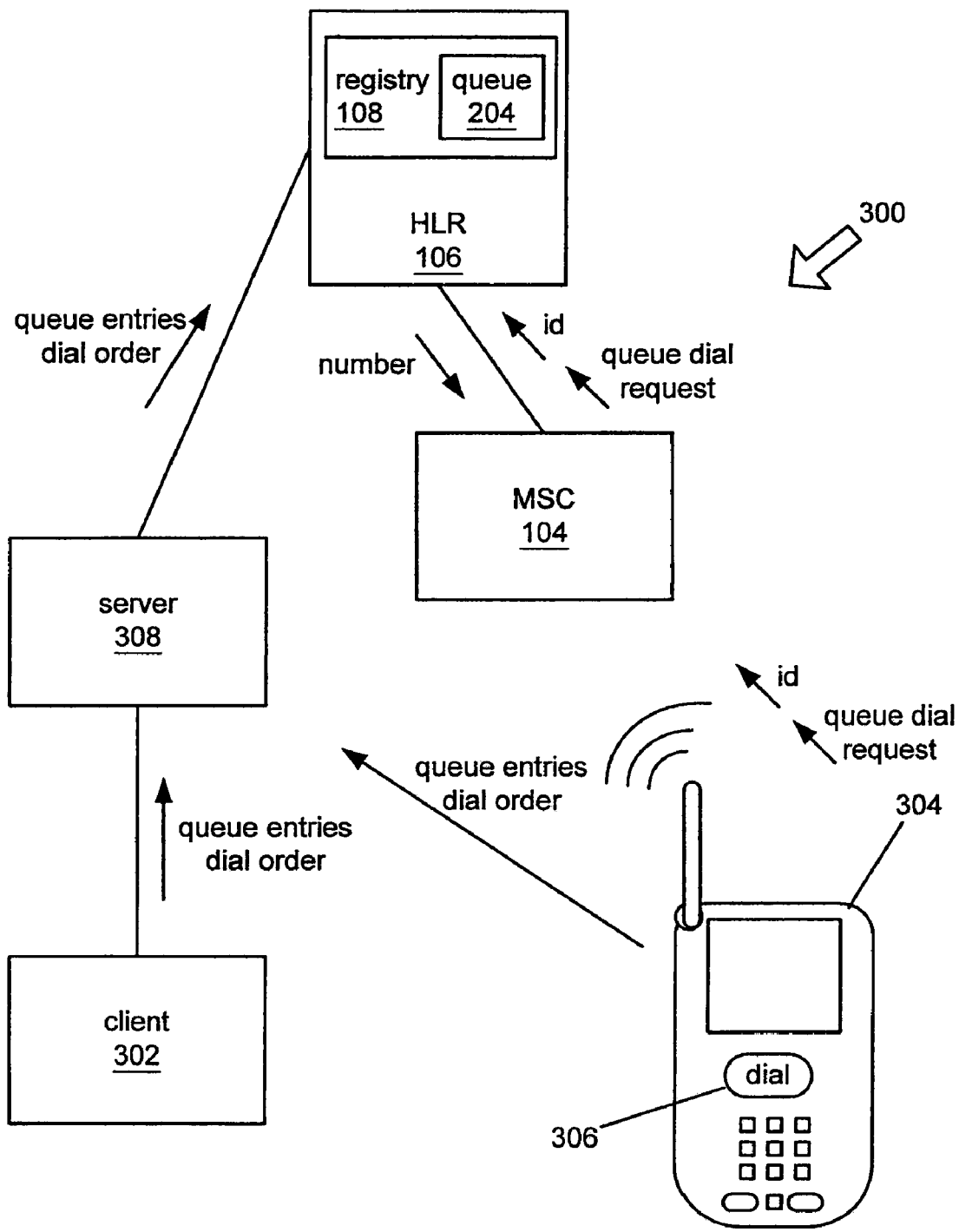
FIG. 3 is a block diagram of an embodiment of a communication system.

FIG. 3 is a block diagram of an embodiment 300 of a communication system in accordance with the present invention. The user registry 108 of the HLR 106 comprises the call queue 204 for a wireless device user. Within the registry 108, the call queue 204 may be comprised by a record for the user. The user may configure the call queue 204 using a client device 302, which may comprise any computing device capable of communicating with a server 308 over a network (not shown). Examples of networks include telephone networks, the Internet, and private voice and data networks. The server 308 acts as a front end to the HLR 106, providing isolation and security, buffering, and traffic management, among other things. Both the client 302 and the server 308 may be any computing devices comprising a memory and a processor, the memory storing instructions which may be supplied to and executed by the processor, the memory further storing data which may be operated upon by the executed instructions. In one embodiment, the server 308 is an Internet server. Examples of client devices are hand-held computers, laptop and sub-notebook computers, desktop computers, automobile computers, and so on. In one embodiment, the phone 304 may act as the client 302 for configuring the queue 204. The client 302 (or the phone 304) may provide queue entries to the server 308. In some embodiments, the client 302 (and/or phone 304) may also provide a dial order for the queue entries. The server 308 provides the queue information (entries, and possibly the dial order) to the HLR 106, and the HLR 106 associates the queue information with the user in some manner, for example in the user record in the registry 108.

Subsequently, the phone 304 or other wireless device may be operated to dial the queue entries. The user may operate a queue dial function, such as button 306, in order to dial entries from the queue. Operation of the queue dial function results in the phone 304 communicating a queue dial request to the MSC 104. An id also is provided from the phone 304 to the MSC 104, which passes the id and queue dial request to the HLR 106. The id and the queue dial request may be passed together, or separately. The HLR 106 employs the id to identify the wireless device and to locate the call queue 204 for the user. In other words, the call queue is indexed according to the identification of the wireless device.

In one embodiment, the HLR 106 uses the id to look up the user record for the user in the registry 108. The HLR 106 may comprise a queue management function to provide the next entry in the queue 204 to the MSC 104, and the MSC 104 proceeds, in known manners, to dial and connect a call between the party corresponding to the entry and the phone 304. The queue management function may comprise instructions and data which may be executed by a computer system of the HLR 106.

In situations where the phone 304 is roaming away from a home service area, the HRL 106 may communicate the call queue 204 to a visitor location register (VLR—not shown). The VLR may then provide to an MSC in the roaming service area the numbers from the queue 204 in response to a queue dial request from the phone 304.

Figure 4:
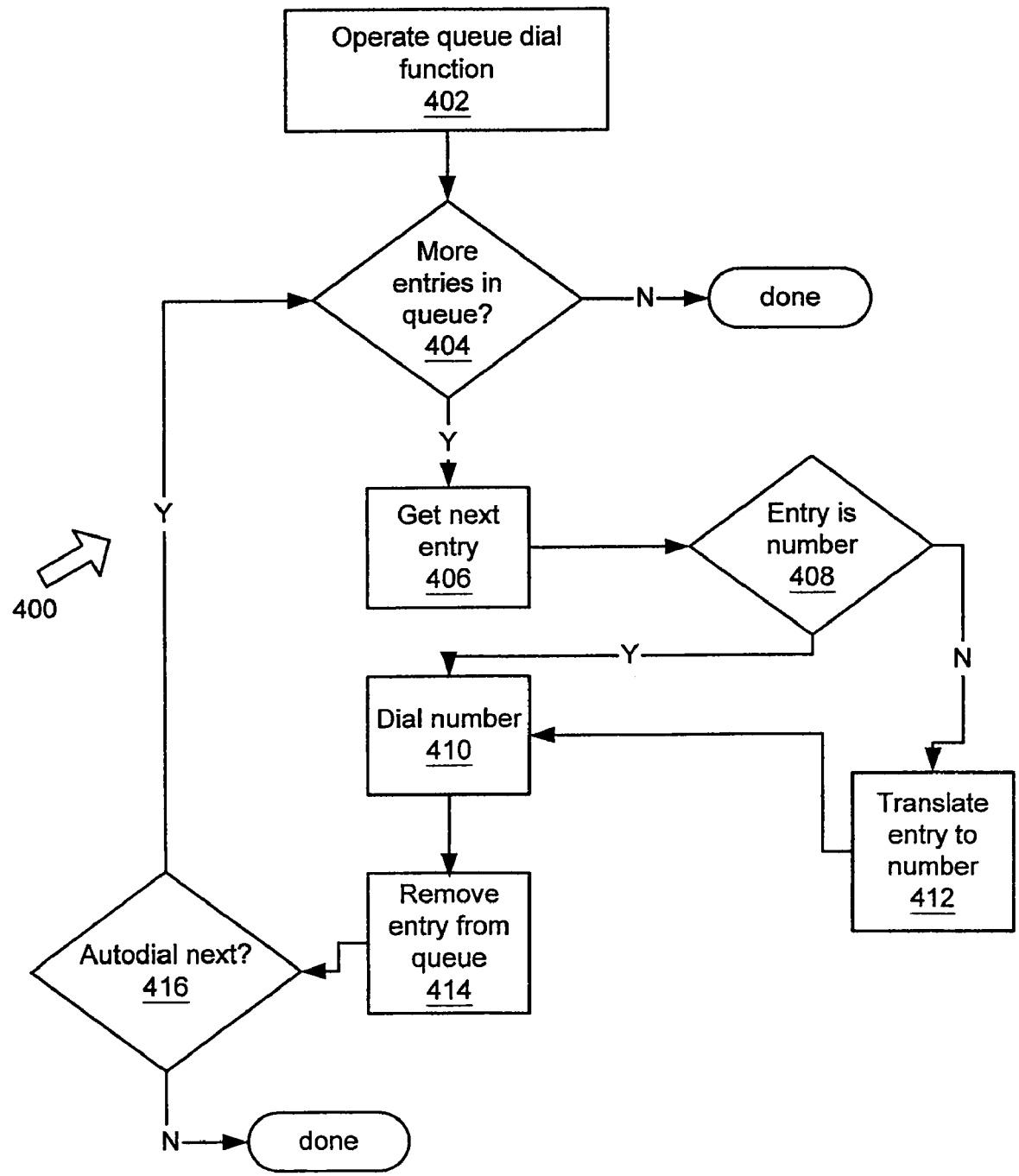
FIG. 4 is a flow chart of a method embodiment.

FIG. 4 is a flow chart of an embodiment 400 of a method of managing a call queue. At 402 a user of a phone or other communication device operates a queue dial function. A check at 404 determines whether more entries remain in the queue. If not, the method concludes. If so, the next entry is retrieved at 406. A check at 408 determines whether the next entry is a dial-able number. If so, the number is dialed at 410. If not (for example, the entry is a name from the address book), the entry at 412 is translated into a dial-able number (for example, by looking up the number corresponding to the name in the address book). After the number is dialed at 410, in embodiments in which the queue is consumed, the entry is removed from the queue at 414. In alternate embodiments where the queue is not consumed, the entry may be left in the queue. A check at 416 determines whether to automatically dial the next entry in the queue. Not all embodiments may include this check—in some embodiments, the next queue entry may always be dialed automatically after a previous call terminates. Still other embodiments may not provide the ability to automatically dial the next queue entry. If auto dialing is not enabled, the method 400 concludes. Otherwise, the method 400 returns to 404 to determine whether more entries are in the queue.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A method of placing a plurality of outgoing calls for use with a wireless communication device, the method comprising:
    storing a plurality of telephone numbers in an outgoing call queue in a predetermined order, each of the plurality of telephone numbers being associated with a telephone device of a different dial-able party;
    receiving a request to initiate dialing a first telephone number of the plurality of telephone numbers stored in the outgoing call queue according to the predetermined order;
    dialing the first telephone number to initiate a first call with a first telephone device of a first party; and
    after completion of the first call, dialing a second telephone number of the plurality of telephone numbers stored in the outgoing call queue according to the predetermined order to initiate a second call with a second telephone device of a second party different from the first party.

2. The method of claim 1, wherein the outgoing call queue is stored in a registry of a wireless network comprising the wireless communication device.

3. The method of claim 1, wherein the wireless communication device is coupled to a wireless network comprising a registry, the registry comprises a plurality of outgoing call queues, and the method further comprises:
    receiving an identification associated with one of the plurality of outgoing call queues; and
    after receiving the request to initiate dialing, using the received identification to locate the one of the plurality of outgoing call queues associated with the identification.

4. The method of claim 3, wherein the wireless network comprises a home location registry that comprises the registry, the identification is provided to the home location registry, and the home location registry uses the identification to locate the outgoing call queue in the plurality of outgoing call queues of the registry.

5. The method of claim 1, wherein the wireless communication device is coupled to a wireless network comprising a mobile switching center coupled to a home location registry,
    the home location registry comprises a registry comprising a plurality of outgoing call queues each associated with an identification of a wireless communication device,
    the request is received by the mobile switching center, and the method further comprises:
        at the mobile switching center, receiving an identification associated with the wireless communication device;
        communicating the request and the identification associated with the wireless communication device from the mobile switching center to the home location registry;
        at the home location registry, using the identification to locate the outgoing call queue in the plurality of outgoing call queues of the registry;
        at the home location registry, communicating the first telephone number to the mobile switching center, the mobile switching center dialing the first telephone number to initiate the first call with the first party.

6. The method of claim 1 for use with a wireless network comprising the wireless communication device, a registry, and a server coupled to both the registry and the wireless communication device, wherein the outgoing call queue is stored in the registry of the wireless network, the method further comprising:
    using the wireless communication device to communicate queue information to the server;
    at the server, forwarding the queue information to the registry;
    at the registry, configuring the outgoing call queue according to the queue information.

7. The method of claim 1 for use with a wireless network comprising the wireless communication device, a registry, a client computing device different from the wireless communication device, and a server coupled to the registry, the client computing device, and the wireless communication device, wherein the outgoing call queue is stored in the registry, the method further comprising:
    using the client computing device to communicate queue information to the server;
    at the server, forwarding the queue information to the registry;
    at the registry, configuring the outgoing call queue according to the queue information.

8. The method of claim 7, wherein the queue information comprises a new telephone number for the outgoing call queue and an indication of a location of the new telephone number within the predetermined order, and
    storing the plurality of telephone numbers in the outgoing call queue in the predetermined order comprises at the registry, adding the new telephone number to the outgoing call queue in the indicated location within the predetermined order.

9. The method of claim 8, wherein the registry of a wireless network comprises a plurality of outgoing call queues each associated with an identification of a wireless communication device, the queue information comprises an identification associated with the wireless communication device, and the method further comprises:

at the registry, using the identification to locate the outgoing call queue of the plurality of outgoing call queues.

10. The method of claim 1, wherein the second telephone number is dialed automatically after completion of the first call.

11. The method of claim 1, wherein after completion of the first call and before the second telephone number is dialed, the method further comprises:

receiving a request to initiate dialing the second telephone number.

12. A system comprising a mobile switching center coupled between a wireless communication device and a registry, the wireless communication device comprising an identifier, the wireless communication device being operable to transmit a queue dial request and the identifier to the registry;

the registry comprising a plurality of outgoing call queues and a queue management function, each of the plurality of outgoing call queues being associated with an identifier of a wireless communication device, each of the plurality of outgoing call queues further comprising an ordered list of telephone numbers, the registry being operable to receive the queue dial request and the identifier transmitted by the wireless communication device and locate the outgoing call queue of the plurality of outgoing call queues associated with the identifier, the queue management function being operable to select a next telephone number from the ordered list of telephone numbers of the outgoing call queue associated with the identifier of the wireless communication device and to transmit the next telephone number to the mobile switching center; and the mobile switching center being operable to dial the next telephone number.

13. The system of claim 12, wherein the wireless communication device comprises a plurality of buttons, the wireless communication device being configured to transmit the queue dial request to the registry in response to actuation of a single button of the plurality of buttons.

14. The system of claim 12, wherein the wireless communication device is configured to transmit the queue dial request to the registry in response to a queue dial command spoken to the wireless communication device.

15. The system of claim 12, wherein the queue management function is further configured to remove the next telephone number from the ordered list of telephone numbers of the outgoing call queue associated with the identifier of the wireless communication device.

16. The system of claim 12, further comprising:

a server configured to receive queue information comprising the identifier of the wireless communication device from a client computing device other than the wireless communication device, the server being further configured to provide the queue information to the registry, in response to receiving the queue information, the registry being configured to locate the outgoing call queue associated with the identifier of the wireless communication device and update the located outgoing call queue using the queue information.

17. The system of claim 16, wherein the queue information comprises:

one or more telephone numbers for addition to the outgoing call queue associated with the identifier of the wireless communication device, updating the located outgoing call queue using the queue information comprising adding the one or more telephone numbers to the located outgoing call queue.

18. The system of claim 16, wherein the queue information comprises:

a dial order for the ordered list of telephone numbers of the outgoing call queue associated with the identifier of the wireless communication device, updating the located outgoing call queue using the queue information comprising ordering the ordered list of telephone numbers in accordance with the dial order.

19. A method of placing a plurality of outgoing calls for use with a wireless communication device, the method comprising:

storing a plurality of telephone numbers in an outgoing call queue in a predetermined order;

receiving a request to initiate dialing the plurality of telephone numbers stored in the outgoing call queue according to the predetermined order; and until all of the plurality of telephone numbers stored in the outgoing call queue have been dialed in accordance with the predetermined order, dialing a next telephone number of the plurality of telephone numbers stored in the outgoing call queue according to the predetermined order to initiate a call, and after completion of the call, removing the next telephone number from the plurality of telephone numbers stored in the outgoing call queue.

20. The method of claim 19, wherein, each of the plurality of telephone numbers is associated with a telephone device a different dial-able party.

21. The method of claim 19, further comprising:

before all of the plurality of telephone numbers stored in the outgoing call queue have been dialed in accordance with the predetermined order, adding a new telephone number to the plurality of telephone numbers in the outgoing call queue.

22. The method of claim 19, further comprising:

before all of the plurality of telephone numbers stored in the outgoing call queue have been dialed in accordance with the predetermined order, modifying the predetermined order of the plurality of telephone numbers in the outgoing call queue.

23. The method of claim 19, further comprising:

before all of the plurality of telephone numbers stored in the outgoing call queue have been dialed in accordance with the predetermined order, modifying the plurality of telephone numbers in the outgoing call queue.

24. The method of claim 19, wherein the wireless communication device is coupled to a wireless network comprising a registry, the registry comprises a plurality of outgoing call queues, and the method further comprises:

receiving an identification associated with one of the plurality of outgoing call queues; and after receiving the request to initiate dialing, using the received identification to locate the one of the plurality of outgoing call queues associated with the identification.

25. The method of claim 19, wherein the wireless communication device is coupled to a wireless network comprising a mobile switching center coupled to a home location registry, the home location registry comprises a registry comprising a plurality of outgoing call queues each associated with an identification of a wireless communication device, the request is received by the mobile switching center, and the method further comprises:

at the mobile switching center, receiving an identification associated with the wireless communication device;

communicating the request and the identification associated with the wireless communication device from the mobile switching center to the home location registry;

at the home location registry, using the identification to locate the outgoing call queue in the plurality of outgoing call queues of the registry;

at the home location registry, communicating the next telephone number to the mobile switching center, the mobile switching center dialing the next telephone number to initiate the call.

26. The method of claim 19, wherein the outgoing call queue is stored in a registry of a wireless network comprising the wireless communication device, a server is coupled to the registry;

a client computing device different from the wireless communication device is coupled to the server, and the method further comprises:

using the client computing device to communicate queue information to the server;

at the server, forwarding the queue information to the registry;

at the registry, configuring the outgoing call queue according to the queue information.

27. The method of claim 26, wherein the queue information comprises a new telephone number for the outgoing call queue and an indication of a location of the new telephone number within the predetermined order, and storing the plurality of telephone numbers in the outgoing call queue in the predetermined order comprises at the registry, adding the new telephone number to the outgoing call queue in the indicated location within the predetermined order.

28. The method of claim 26, wherein the registry of a wireless network comprises a plurality of outgoing call queues each associated with an identification of a wireless communication device, the queue information comprises an identification associated with the wireless communication device, and the method further comprises:

at the registry, using the identification to locate the outgoing call queue of the plurality of outgoing call queues.

29. The method of claim 19, wherein after completion of the call, the method further comprises:

receiving another request to initiate dialing.

30. A memory having computer-executable instructions for performing a method of placing a plurality of outgoing calls for use with a wireless communication device, the method comprising:

storing a plurality of telephone numbers in an outgoing call queue in a predetermined order;

receiving a request to initiate dialing the plurality of telephone numbers stored in the outgoing call queue according to the predetermined order; and until all of the plurality of telephone numbers stored in the outgoing call queue have been dialed in accordance with the predetermined order, dialing a next telephone number of the plurality of telephone numbers stored in the outgoing call queue according to the predetermined order to initiate a call, and after completion of the call, removing the next telephone number from the plurality of telephone numbers stored in the outgoing call queue.

31. A home location registry coupled to a mobile switching center of a wireless communication network, the home location registry comprising:

a user registry having a plurality of user records and a plurality of call queues, each user record being associated with an identification associated with a unique user, each call queue being associated with an identification associated with a unique user and comprising an ordered list of telephone numbers;

the home location registry being configured to receive a queue dial request and an identification from a wireless communication device, and in response thereto, use the received identification to locate a user record and a call queue in the user registry associated with the received identification, the home location registry being further configured to provide a telephone number from the ordered list of telephone numbers to the mobile switching center for dialing thereby to initiate a call over the wireless communication network between the wireless communication device and a party associated with the provided telephone number.

32. The home location registry of claim 31, wherein the home location registry is coupled to the mobile switching center of the wireless communication network by a visitor location registry, the home location registry being further configured to provide the telephone number from the ordered list of telephone numbers to the visitor location registry for forwarding thereby to the mobile switching center.

33. The home location registry of claim 31, wherein the home location registry is configured to receive queue information and an identification from the wireless communication device and use the queue information to configure the call queue in the user registry associated with the received identification.

34. The home location registry of claim 33, wherein the queue information comprises one or more new telephone numbers for the call queue and an indication of where in the ordered list of telephone numbers the one or more new telephone numbers should be located.

35. The home location registry of claim 33, wherein the queue information comprises a new dialing order for the ordered list of telephone numbers.

36. The home location registry of claim 31, wherein the home location registry is configured to receive queue information and an identification from a client device other than the wireless communication device coupled to the home location registry, the home location registry being configured to use the queue information to configure the call queue in the user registry associated with the received identification.

37. A wireless telephone comprising:

a memory;

a processor;

a call queue function configured to enable the configuration of an outgoing call queue comprising an ordered list of telephone numbers, each telephone number of the ordered list being associated with a different party; and a queue dial function which, when operated, dials a first telephone number in the ordered list of telephone numbers of the outgoing call queue to initiate a call to a first party, and after completion of the call, dials a next telephone number in the ordered list of telephone numbers of the outgoing call queue to initiate a new call to a second party, the second party being different from the first party, the processor and the memory cooperating to enable the call queue function.

38. A wireless telephone comprising:

an address book comprising a user-specified ordering collection of names in an unordered arrangement, each name being associated with a telephone number of a dial-able party;

an outgoing call queue comprising a user-specified ordered list of entries in an order different from the unordered arrangement of the address book, each entry being associated with a telephone number of a dial-able party;

a call queue function configured to enable the user-specified ordering of the outgoing call queue by the user; and a queue dial function configured to dial the telephone numbers associated with the ordered list of entries in accordance with the order of the entries in the ordered list of entries.

39. The wireless telephone of claim 38, wherein at least a portion of the entries of the ordered list of entries comprises a name of the collection of names in the address book, and the telephone number of the dial-able party associated with each entry in the ordered list of entries comprises the telephone number of the dial-able party associated with the name in the collection of names in the address book.

40. The wireless telephone of claim 38, wherein the queue dial function is further configured to remove each of the entries from the ordered list of entries after dialing the telephone number associated with the entry.

41. The wireless telephone of claim 38, wherein the queue dial function is further configured to dial a first entry of the ordered list of entries in response to receiving user input instructing the queue dial function to dial the first entry in the ordered list of entries.

42. The wireless telephone of claim 41, wherein the queue dial function is further configured to dial a next sequential entry of the ordered list of entries in response to receiving user input instructing the queue dial function to dial the next entry in the ordered list of entries.

* * * * *